(12) United States Patent
Hitchings et al.

(10) Patent No.: US 9,315,426 B2
(45) Date of Patent: Apr. 19, 2016

(54) COATINGS FOR REFRACTORY SUBSTRATES

(75) Inventors: Jay R. Hitchings, Downingtown, PA (US); Jason Hitchings, Downingtown, PA (US)

(73) Assignee: Comanche Tecnologies, LLC, Downingtown, PA (US)

( * ) Notice: Subject to any disclaimer, the term of this patent is extended or adjusted under 35 U.S.C. 154(b) by 754 days.

(21) Appl. No.: 13/112,865

(22) Filed: May 20, 2011

(65) Prior Publication Data
US 2011/0283836 A1    Nov. 24, 2011

Related U.S. Application Data

(60) Provisional application No. 61/346,513, filed on May 20, 2010.

(51) Int. Cl.
*C04B 41/87*    (2006.01)
*C04B 41/00*    (2006.01)
(Continued)

(52) U.S. Cl.
CPC ............ *C04B 41/009* (2013.01); *B22D 43/004* (2013.01); *C04B 41/52* (2013.01);
(Continued)

(58) Field of Classification Search
CPC ...................................................... C04B 41/87
USPC ............... 75/407; 106/38.22, 38.27; 266/227, 266/280; 427/244; 76/407
See application file for complete search history.

(56) References Cited

U.S. PATENT DOCUMENTS

| 2,243,296 | A | 5/1941 | Sweetland |
| 2,829,060 | A | 4/1958 | Emblem et al. |

(Continued)

FOREIGN PATENT DOCUMENTS

| EP | 0189258 A2 | 7/1986 |
| EP | 0109153 B1 | 11/1986 |

(Continued)

OTHER PUBLICATIONS

Green, "Iron and Manganese Oxides: Culprits of Refractory Erosion," Modern Casting, Jul. 1, 1996.

(Continued)

*Primary Examiner* — Brian Walck
(74) *Attorney, Agent, or Firm* — Alan G. Towner, Esq.; Pietragallo Gordon Alfano Bosick & Raspanti, LLP (57) ABSTRACT

A temperature-specific compound applied to refractory substrates having molten metal-contacting surfaces creates a chemically active and viscous surface that dramatically increases the ability of the treated substrate to remove slag, dross and other inclusions from a base metal alloy as it passes through or contacts the substrate. The refractory substrates include molten metal filters used by foundries and metal casters such as reticulated ceramic foam, cellular/honeycomb, silica mesh, and others that rely on their physical or sieving ability to remove particulate impurities from the base alloy being cast. The chemically active surfaces significantly increase filtration efficiency through a treatment process tailored to the specific chemistry of the alloy being filtered, such as ferrous metals that include iron, steel and more. Other refractory substrates such as aluminum oxide, magnesium oxide, zirconium oxide, aluminum silicate, silicon carbide (as common with reticulated ceramic foam filters) and the like may also include the coatings.

22 Claims, 7 Drawing Sheets

(51) Int. Cl.
*C04B 41/52* (2006.01)
*B22D 43/00* (2006.01)
*F27D 99/00* (2010.01)
*C04B 111/00* (2006.01)

(52) U.S. Cl.
CPC .............. *C04B 41/87* (2013.01); *F27D 99/00* (2013.01); *C04B 2111/00793* (2013.01); *C04B 2111/00887* (2013.01)

(56) References Cited

U.S. PATENT DOCUMENTS

| | | |
|---|---|---|
| 2,995,453 A | 8/1961 | Noble et al. |
| 3,615,781 A | 10/1971 | Schneider et al. |
| 3,682,668 A | 8/1972 | Fujita et al. |
| 3,721,574 A | 3/1973 | Schneider et al. |
| 3,920,578 A | 11/1975 | Yates |
| 3,971,665 A | 7/1976 | Suzuki et al. |
| 3,977,888 A | 8/1976 | Sano et al. |
| 4,015,038 A | 3/1977 | Romanski et al. |
| 4,069,057 A | 1/1978 | Kamei et al. |
| 4,088,431 A | 5/1978 | Johnson et al. |
| 4,092,153 A | 5/1978 | Yarwood et al. |
| 4,096,104 A | 6/1978 | Spain et al. |
| 4,322,464 A | 3/1982 | Beckley |
| 4,510,253 A | 4/1985 | Felice et al. |
| 4,708,326 A | 11/1987 | Brockmeyer et al. |
| 4,721,567 A | 1/1988 | Uram |
| 4,789,140 A | 12/1988 | Lirones |
| 4,857,489 A | 8/1989 | Bearden |
| 4,955,427 A | 9/1990 | Hitchings |
| 5,124,040 A | 6/1992 | Hitchings |
| 5,238,571 A | 8/1993 | Menk |
| 5,290,589 A | 3/1994 | Clough et al. |
| 5,332,432 A | 7/1994 | Okubi et al. |
| 5,650,121 A * | 7/1997 | Dody et al. .................. 266/280 |
| 5,676,731 A | 10/1997 | Hitchings |
| 5,900,382 A | 5/1999 | Shaw |
| 6,254,810 B1 | 7/2001 | Delvaux et al. |
| 6,299,778 B1 | 10/2001 | Penth et al. |
| 6,521,015 B1 | 2/2003 | Eckert |
| 6,562,749 B1 | 5/2003 | Lednor et al. |
| 6,946,095 B2 | 9/2005 | Yokota et al. |
| 7,201,572 B2 | 4/2007 | Wood et al. |
| 7,449,424 B2 | 11/2008 | Felix et al. |
| 7,696,124 B2 | 4/2010 | Felix et al. |
| 8,088,216 B2 | 1/2012 | Kishimoto |
| 8,273,289 B2 | 9/2012 | Hitchings |
| 8,323,796 B2 | 12/2012 | Schmidt et al. |
| 2008/0173591 A1 | 7/2008 | Hitchings |
| 2009/0000520 A1 | 1/2009 | Kishimoto |
| 2009/0011925 A1 | 1/2009 | Felix et al. |
| 2010/0133106 A1 | 6/2010 | Ramberg et al. |
| 2011/0084430 A1 | 4/2011 | Hitchings et al. |
| 2013/0079214 A1 | 3/2013 | Schmidt et al. |
| 2013/0089720 A1 | 4/2013 | Kirby et al. |

FOREIGN PATENT DOCUMENTS

| | | |
|---|---|---|
| EP | 0213900 A2 | 3/1987 |
| EP | 1113890 B1 | 12/2003 |
| EP | 2364795 B1 | 7/2012 |
| WO | 2010063557 A1 | 6/2010 |

OTHER PUBLICATIONS

Donald, "Surface Interactions between Non-Ferrous Metallurgical Slags and Various Refractory Materials," Department of Metallurgy and Materials Science, University of Toronto, Apr. 1997.

Donald et al., "Surface Interactions Between Fayalite Slags and Synthetic Spinels and Solid Solutions," Metallurgical and Materials Transactions B, vol. 29B, Apr. 1998.

Andrews et al., "Molten Metal Filtration—An Engineered Balance," Ductile Iron News, 1999.

Zhao et al., "The Effect of MgO on Liquidus Temperatures of Fayalite Slags," Metallurgical and Materials Transactions B, vol. 30B, Dec. 1999.

Zhou et al., "Deep Filtration of Molten Aluminum using Ceramic Foam Filters and Ceramic Particles with Active Coatings," Metallurgical and Materials Transactions A, vol. 34A, May 2003.

Hitchings et al., "Refractory Cloth Filtration of Ductile Iron and the Mechanism of Inclusion Trapping," AFS Transactions, American Foundry Society, Paper 04-132(05), 2004.

Katz, "Slags' Effects on Cast Iron Production," AFS Transactions, American Foundry Society, Paper 04-132(05), 2004.

Damoah et al., "Purification of Aluminum Through $Al_2O$—$AlF_3$ Active Filtration," Proceedings of the 4th Annual ISC Symposium, Apr. 21, 2010.

Henao et al., "Investigation of Liquidus Temperatures and Phase Equilibria of Copper Smelting Slags in the $FeO$—$Fe_2O_3$—$SiO_2$—$CaO$—$MgO$—$Al_2O_3$ System at $PO_2$ $10^{-8}$ atm," Metallurgical and Materials Transactions B, vol. 41B, Aug. 2010.

Nwaogu et al., "Foundry Coating Technology: A Review," Materials Sciences and Application, 2011.

Steel Founders' Society of America, Standard Specification for Forsterite and/or Olivine Aggregate and Flour, SFSA Designation 15-81, Revised I98 1, Version 15, 1981.

* cited by examiner

COATINGS FOR REFRACTORY SUBSTRATES

CROSS-REFERENCE TO RELATED APPLICATION

This application claims the benefit of U.S. Provisional Patent Application Ser. No. 61/346,513 filed May 20, 2010, which is incorporated herein by reference.

FIELD OF THE INVENTION

The present invention relates to coatings for refractory substrates, and more particularly relates to active coatings for refractory filters and other substrates that help remove inclusions and other impurities from molten metals such as ferrous alloys.

BACKGROUND INFORMATION

The effective removal of slag, dross and other potentially harmful inclusions from molten metal during the casting process has conventionally relied on a wide spectrum of molten metal filters that capture the impurities by physical means. For example, reticulated ceramic foam filters utilize a torturous path principle whereby as the molten metal is forced to travel through the random nooks and crannies of the filter, many of the particulate inclusions are trapped within interior cavities and passages. In a similar manner, cellular or honeycomb molten metal filters act as sieves or screens that catch large particle inclusions that are too large to pass through the pore openings of the filters.

While screen-based filtration techniques have been widely used, they are ineffective in capturing small inclusions that pass through the pores of the filters. Furthermore, they are structurally unable to increase the molten metal throughput without a corresponding decrease in filtration efficiency. Smaller size inclusions continue to be a problem for foundries and metal casters despite the widespread use of sieving filters. Such inclusions can be detrimental in various castings, particularly castings used in aerospace and other demanding applications. Similarly, while most metal casting producers may desire increases in molten metal throughput per production run, very few are willing to accept the higher potential scrap rate that could occur in switching to larger pore size molten metal filters which would in turn allow additional inclusions to pass through.

Phenolic-resin treated silica mesh filter cloths have also been used to remove inclusions from cast iron. As the molten iron comes in contact with the resin-treated silica cloth, pyrolysis of the resin takes place, creating $Fe_2SiO_4$ that coats the fabric and increases the ability of the filter cloth to capture inclusions. The iron silicate provides a sticky surface that captures and holds slag particulates that are small enough to pass through the mesh holes of the material, and thereby increases the overall efficiency of the filter. Iron silicate also has the ability to form solid solutions with some of the specific impurities unique to different types of cast iron. However, the formation of the iron silicate occurs during the molten ferrous alloy casting process and requires the use of a silica-containing filter in combination with the ferrous alloy. It would be desirable to improve filtration capability by providing controlled amounts of active coatings on various different types of molten metal filters such as reticulated ceramic foam, cellular/honeycomb and the like.

SUMMARY OF THE INVENTION

The present invention provides coatings applied to refractory substrates having molten metal-contacting surfaces. The coatings create chemically active and viscous surfaces that significantly increase the ability of the treated substrate to remove slag, dross and other inclusions from a base metal alloy as it passes through or contacts the substrate. The refractory substrates include molten metal filters used by foundries and metal casters such as reticulated ceramic foam, cellular/honeycomb, silica mesh and the like that rely on their physical or sieving ability to remove particulate impurities from the base alloy being cast. The chemically active surfaces significantly increase filtration efficiency through a treatment process tailored to the specific chemistry of the alloy being filtered, such as ferrous metals. In addition to silica, other refractory substrates such as aluminum oxide, magnesium oxide, zirconium oxide, aluminum silicate and silicon carbide may be treated with the coatings of the present invention.

An aspect of the present invention is to provide a coated refractory substrate capable of withstanding exposure to molten metal comprising a refractory substrate and a coating on at least a portion of the substrate comprising an iron silicon oxide active component and a silicate binder.

Another aspect of the present invention is to provide a method of coating a refractory substrate comprising depositing a coating on at least a portion of the substrate comprising an iron silicon oxide active component and a silicate binder.

A further aspect of the present invention is to provide a method of filtering molten metal comprising passing molten metal through a filter comprising a refractory substrate and a coating on at least a portion of the substrate comprising an iron silicon oxide active component and a silicate binder.

These and other aspects of the present invention will be more apparent from the following description.

DETAILED DESCRIPTION

The present invention provides coatings for refractory substrates that improve their ability to remove inclusions and other impurities from metal castings. In certain embodiments, the coatings are applied to molten metal filters to convert from a strictly physical filtration process to an active process for removing inclusions and other impurities from molten alloys. The coated filters can capture significantly more inclusions than conventional filters with no significant changes or modifications required in the casting mold pattern, process or other end-user application parameters. Furthermore, metal casters desiring an increased throughput rate will have less reduction in total filter efficiency when switching to a larger pore-size, due to the chemical filtration capability of the present coated filters.

A wide variety of ceramic-type and other molten metal filters may be coated in accordance with the present invention, including reticulated ceramic foam, ceramic honeycomb, silica mesh, fiberglass mesh, ceramic coated silica mesh, ceramic coated fiberglass mesh, and extruded lattice type filters. The coatings produce beneficial by-product reactions that enhance inclusion removal and promote higher quality end castings as the molten metal passes through the coated filter material.

In addition to filters, the present coatings may be applied to other refractory substrates. For example, the coatings may be applied to the interior surface of ceramic pour cones used in investment casting, the interior surface of riser sleeves, and the inner linings of pouring or holding ladles. In each of these applications, the material surface that contacts the molten alloy can be treated with the present coatings. The active component of the coating may react by absorbing harmful alloy-specific reaction byproducts, e.g., by forming into a solid solution that holds the byproducts to the surface of the treated vessel or material.

In accordance with the present invention, a coating is applied on at least a portion of a refractory substrate. The coating comprises an iron silicon oxide active component and a silicate binder. The iron silicon oxide active component may include $Fe_2SiO_4$, $Fe_2O_3$, $FeO$, $SiO_2$ or a combination thereof. For example, the iron silicon oxide active component may comprise $Fe_2O_3$ and/or $FeO$ and $SiO_2$. In another embodiment, the iron silicon oxide active component comprises Fayalite ($Fe_2SiO_4$). Fayalite is present in certain metallurgical slags, for example, in large scale metallurgical smelting operations where Fayalite is a discarded byproduct. The material has a melting point of about 2,223° F. (1,210° C.) and is a part of the Olivine group of minerals. Within the Olivine group, it can be found in both the Fayalite-Forsterite series and the Fayalite-Tephroite series. The iron silicon oxide active component may optionally comprise at least one additional oxide such as $Al_2O_3$, CaO, ZnO and/or MgO.

The iron silicon oxide may be provided in granular form having an average particle size range of from about 10 to about 10,000 microns, for example, from about 30 to about 3,500 microns. To ensure a uniform coating, it is desirable to control the particle size of the iron silicon oxide. The particular particle size utilized may depend on the pore size and specific morphology of the filter to be coated. Filters with smaller pore sizes tend to require a finer consistency and vice versa.

It has been found that iron silicon oxide particles do not readily adhere to the surface of ceramic-based filters. In accordance with the present invention, a silicate bonding agent capable of withstanding high temperatures is used to enable the iron silicon oxide particles to adhere to the surface of the ceramic filter. The use of an alkaline silicate binder provides a secure and stable bond between the surface of the refractory substrate and the coating before and after melting. The silicate binder thus helps to bond the iron silicon oxide active component to the refractory substrate prior to exposure to molten metal. Suitable alkane silicate binders include potassium silicate, sodium silicate and the like. Potassium silicate may be particularly preferred due to its drying properties at lower temperatures. The iron silicon oxide typically comprises from about 20 to about 99 weight percent of the coating, while the silicate binder typically comprises from about 1 to about 80 weight percent. For example, the iron silicon oxide may comprise from about 40 to about 95 weight percent and the silicate binder may comprise from about 5 to about 60 weight percent.

In an embodiment of the present invention, the silicate binder is applied to the refractory substrate separately from the iron silicon oxide active component. For example, the silicate binder may be applied as a first layer on at least a portion of the refractory substrate, followed by application of the iron silicon oxide active component. The face of the filter being treated may be coated with a solution of alkaline silicate, followed by an application of granular iron silicon oxide across the coated surface area and into at least a portion of the pore openings of the filter. The first layer comprising the silicate binder may thus contact the refractory substrate directly, while the iron silicon oxide particles form a second layer covering the first silicate binder layer. The alkaline silicates are used as bonding agents to hold the granular iron silicon oxide particles securely to the surface. In this embodiment, the first silicate binder layer may have a typical thickness of from about 10 to about 200 microns, for example, from about 25 to about 130 microns. The second layer comprising iron silicon oxide particles may have a typical thickness of from about 200 to about 1,000 microns, for example, from about 300 to about 500 microns.

In another embodiment of the present invention, the iron silicon oxide active component and silicate binder may be applied to the refractory substrate together, for example, in liquid or paste form as an aqueous suspension of the iron silicon oxide particles and silicate-forming compounds. The applied coating may thus comprise both the iron silicon oxide particles and silicate binder in the same layer.

The coated filters may be placed into any variety of molding setups or investment casting pour cones, and provide filtration through both physical sieving and the chemical activity of the coating. Reactions occur upon contact of the molten alloy with the surface of the filter. For example, the iron content of the iron silicon oxide active component may be reduced to form certain reaction byproducts specific to the cast ferrous alloy. As a particular example, when molten ductile iron makes contact with the iron silicon oxide component of the coating, the iron component within the iron silicon oxide may be replaced by magnesium reaction products, which transforms the coating into spinel-like compounds having very high melting points. In the case of gray iron, the iron of the iron silicon oxide may be replaced by manganese silicates and oxides. In either case, the chemistry of the iron silicon oxide coating changes upon contact with the cast ferrous alloy. At the same time this conversion is taking place, the heat of the molten alloy melts the granular iron silicon oxide and may spread the coating across the surface face and into the pores of the filter interior. During this contact reaction, the viscous and sticky surfaces created by the iron silicon oxide help capture and entrap endogenous and exogenous slag and inclusions, both large and small, on the surface face and within the pores or interior channels of the filter. Without this surface-active coating, the smaller particulate inclusions can pass through the pores and holes of the filter, and could eventually end up in the casting itself.

In accordance with an embodiment of the invention, the composition of the iron silicon oxide surface-active coating may be selected based upon the chemistry of the possible inclusions or slag/dross unique to the alloy being cast. In the case of ferrous alloys, inclusions such as magnesium reaction products found in ductile iron or manganese silicates and oxides common to gray iron may be removed by reaction with the active coating to form solid solutions that are subsequently held in place on the filter surface. Without the sticky filter surface, the inclusions can pass through the pores and interior of the filter and onward through the runner system and end-casting. Examples of problematic inclusions associated with ferrous alloys include Tephroite and Forsterite. Tephroite is a manganese silicate ($Mn_2SiO_4$) known to cause blowhole cavities and other porosity related defects in gray iron castings. Forsterite is another magnesium silicate ($Mg_2SiO_4$) that frequently causes cell boundary inclusions in the casting microstructure that weaken structural integrity.

A chemical analysis of an iron silicon oxide material is shown in Table 1. However, the amounts of iron oxides, silicon dioxide and other oxides may be adjusted as desired.

TABLE 1

| Component | Weight % of Total |
|---|---|
| $Fe_2O_3$ + FeO | 57% |
| $SiO_2$ | 29.5% |
| $Al_2O_3$ | 5% |
| CaO | 3.5% |
| ZnO | 2.5% |
| MgO | 1% |

The following examples illustrate various aspects of the present invention, and are not intended to limit the scope of the invention.

Example 1

Figure 1:
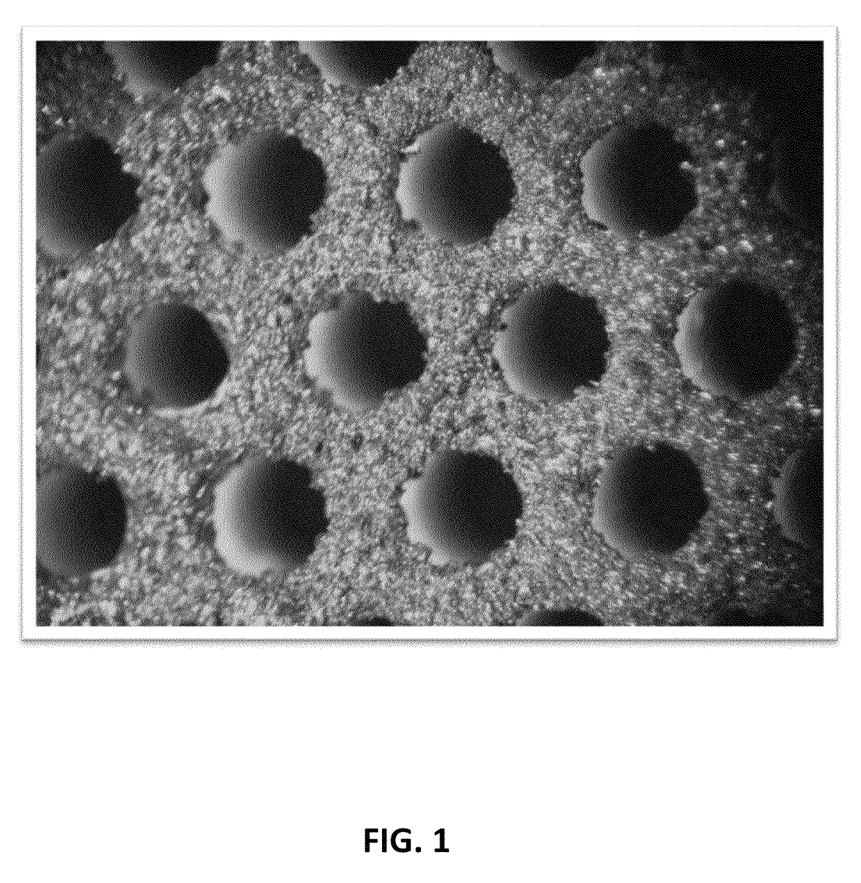
FIG. 1 is an optical micrograph of a coated ceramic cellular honeycomb filter in accordance with an embodiment of the present invention.

Ceramic cellular honeycomb filters made of mullite were used as filter substrates. Each filter was a 2.5 inch×2.5 inch square, with a thickness of 0.5 inch, having approximately 537 open pores or channels, each measuring 0.090 inch in diameter. One surface face of each filter was coated with about 0.24 grams of an aqueous solution of potassium silicate commercially available under the designation KASIL 1 from PQ Corporation, followed immediately by an even application of 1.06 gram of 60-mesh iron silicon oxide having a composition similar to that listed in Table 1. The potassium silicate solution comprised 70.9 weight percent water and 29.1 weight percent silicic acid and potassium salt in a ratio to produce potassium silicate upon drying. Next, the filters were placed in a curing oven and dried. FIG. 1 is an optical micrograph showing the coated ceramic cellular honeycomb filter.

Each filter was placed in the runner system of a green-sand mold, where 46 pounds of class-30 gray iron were poured at a temperature of 2,488° F. Pour time was approximately 12 seconds, and the molds were set aside to cool. After shakeout, the used filters were recovered from the runner system to be sectioned and polished for later examination using both optical and electron microscopy. An additional analysis was performed by taking several used filter sections and dissolving away the iron from the filter material using a methyl bromine solution, for the purpose of revealing the original coated filter surface condition post-exposure to the molten iron. These etched sections were also then examined using scanning electron microscopy (SEM) and energy dispersive x-ray analysis (EDXA). Identical testing was conducted with this same filter type and treatment in a ductile iron application, with all parameters held constant.

Figure 3:
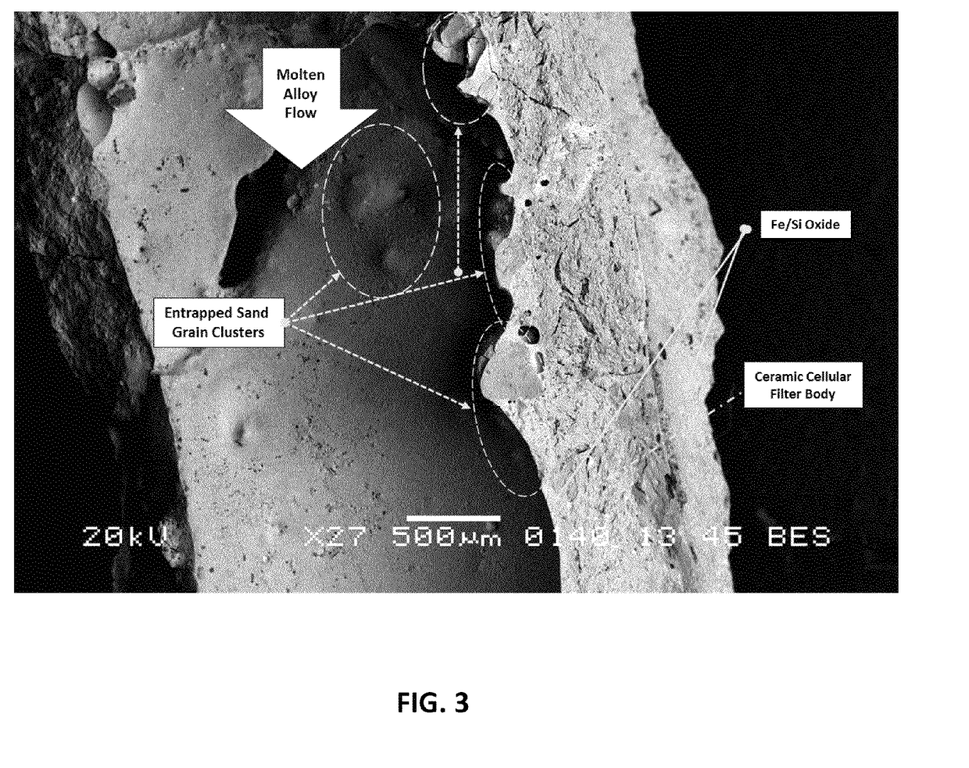
FIG. 3 is a back scattered SEM image of a coated cellular ceramic filter of the present invention, showing sand grains and clusters captured by the coating after the filter was used to filter gray cast iron.

Microscopy shows that as the molten metal made contact and melted the granular coating, the flowing action of the molten alloy spread the coating across the surface of the filter and into its pore channels. As shown in FIG. 3, optical microscopic examination of cross sections of the solidified surface-active layer on the face and interior of the filter showed captured sand inclusions that were small enough to otherwise have passed through the pores of the filter. Inclusions trapped within the surface-active coating layer were present to approximately the mid-point of the interior of the filter, but no further. This discovery showed that the surface-active coating captures and holds inclusions on the front face and interior of the filter, with no visible inclusions on the exiting face. The SEM and EDXA analyses of cross-sectioned samples of surface-active filter confirmed the chemically based filtration ability as evidenced by the change in composition of the coating after being exposed to the molten ferrous alloy. As shown in Tables 2 and 3 below, chemical analysis (EDXA) of cross sections of the used filters showed that the iron silicon oxide coating had absorbed considerable amounts of manganese oxide (replacing iron of the original coating) in the surface-active coating. The microscopic analysis revealed that the surface-active filter coating was very effective in capturing significant amounts of small-particulate inclusions such as sand that were small enough to have otherwise passed through the pore channels of the filter as well as potentially harmful manganese silicate particulates that were actively absorbed and captured by reaction with the coating.

Table 2 illustrates the EDXA histogram analysis of the iron silicon oxide coating before filtering the molten alloy.

TABLE 2

| Element | Weight % | Atomic % |
|---|---|---|
| O | 39.77 | 61.91 |
| Mg | 0.85 | 0.87 |
| Al | 3.98 | 3.68 |
| Si | 17.20 | 15.26 |
| S | 0.36 | 0.28 |
| K | 1.18 | 0.75 |
| Ca | 4.96 | 3.08 |
| Ti | 0.31 | 0.16 |
| Fe | 31.60 | 14.09 |
| Zn | −0.21 | −0.08 |
| Sum | 100 | 100 |

Table 3 illustrates the EDXA histogram analysis of the iron silicon oxide coating after filtering the molten alloy, demonstrating a significant increase in Mn.

TABLE 3

| Element | Weight % | Atomic % |
|---|---|---|
| C | 9.51 | 16.29 |
| O | 43.28 | 55.65 |
| Na | 0.39 | 0.35 |
| Mg | 2.02 | 1.71 |

TABLE 3-continued

| Element | Weight % | Atomic % |
|---|---|---|
| Al | 4.32 | 3.29 |
| Si | 21.36 | 15.64 |
| K | 0.52 | 0.28 |
| Ca | 2.77 | 1.42 |
| Mn | 11.36 | 4.25 |
| Fe | 2.09 | 0.77 |
| Ba | 2.37 | 0.35 |
| Sum | 100 | 100 |

Example 2

Figure 2:
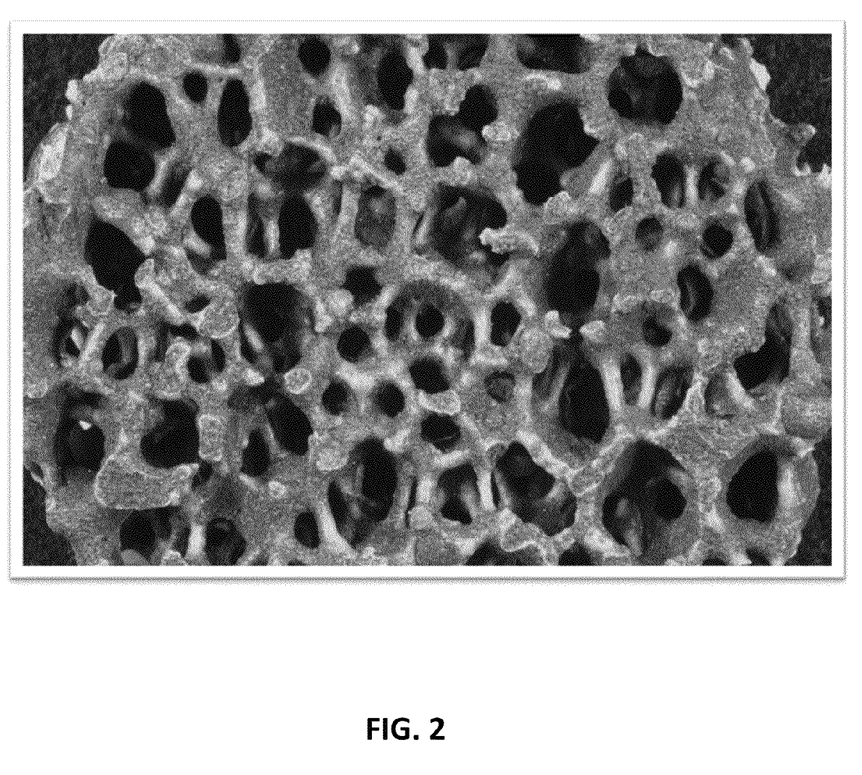
FIG. 2 is an optical micrograph of a coated silicon carbide ceramic foam filter in accordance with an embodiment of the present invention.

Reticulated ceramic foam filters made of silicon carbide were used as filter substrates. Each filter was a 2.75 inch diameter disc, with a thickness of 0.75 inch, and had 10 pores per inch (PPI). Each filter was immersed in about 1.4 gram of an aqueous solution of potassium silicate as described in Example 1 up to one half of its thickness and then drained, followed immediately by an even application of 2.3 gram of 200-mesh iron silicon oxide particles. Next, the filters were placed in a curing oven and dried. FIG. 2 is an optical micrograph showing the coated silicon carbide ceramic foam filter.

The surface-active coated reticulated ceramic foam filters were securely placed, treated face up, in the bottom of an insulating neck-down riser sleeve which was then placed into the cope of a horizontally parted green sand mold. The ferrous alloy poured was 58 pounds of 65-45-12 grade ductile iron. Once the molten ductile iron reached the target pouring temperature of 2,562° F. it was poured directly into the top of the filter-containing riser sleeve. The total pouring time was approximately 11 seconds. Identical testing was conducted with this same filter type and treatment in a gray iron application, with all parameters held constant.

After cooling and shakeout were completed, the used filters were recovered from their riser sleeves to be sectioned and prepared for both optical and electron microscopic analysis. Several of these reticulated ceramic foam filters were run through the same iron-removal technique (using methyl bromine solution once again) to expose the original coated surface of the filter.

Figure 4:
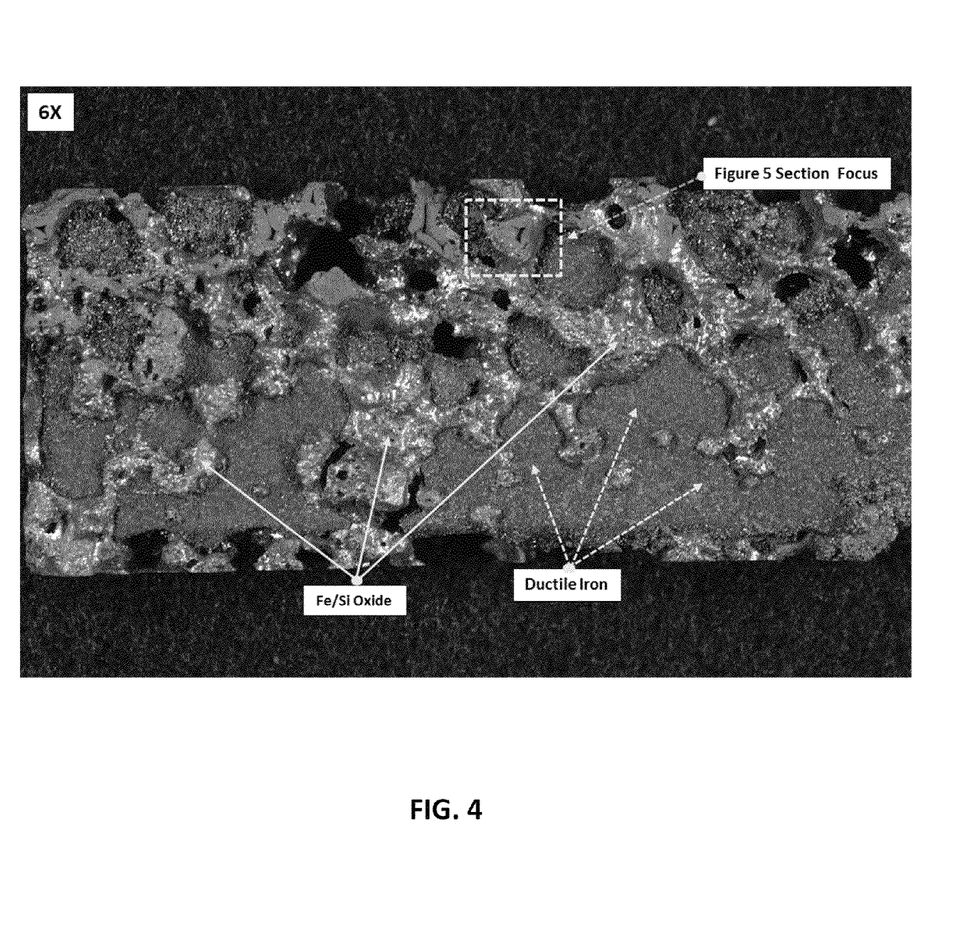
FIG. 4 is a stereo optical micrograph of the top face of a coated reticulated ceramic foam filter of the present invention after exposure to molten ductile iron, showing multiple inclusions and impurities entrapped by the coating.

As seen in FIG. 4, optical microscopy showed that as the molten alloy made contact with the iron silicon oxide on the incoming surface face of the filter, it melted the coating and spread it across the surface face and interior pores to approximately the mid-point thickness of the reticulated ceramic foam filter. Significant amounts of small particulate inclusions such as sand were captured on the surface or encapsulated within the surface-active coating. These smaller inclusions could have passed through the 10 PPI foam filter and onward into the end casting if it were a standard, non-coated filter.

Figure 5:
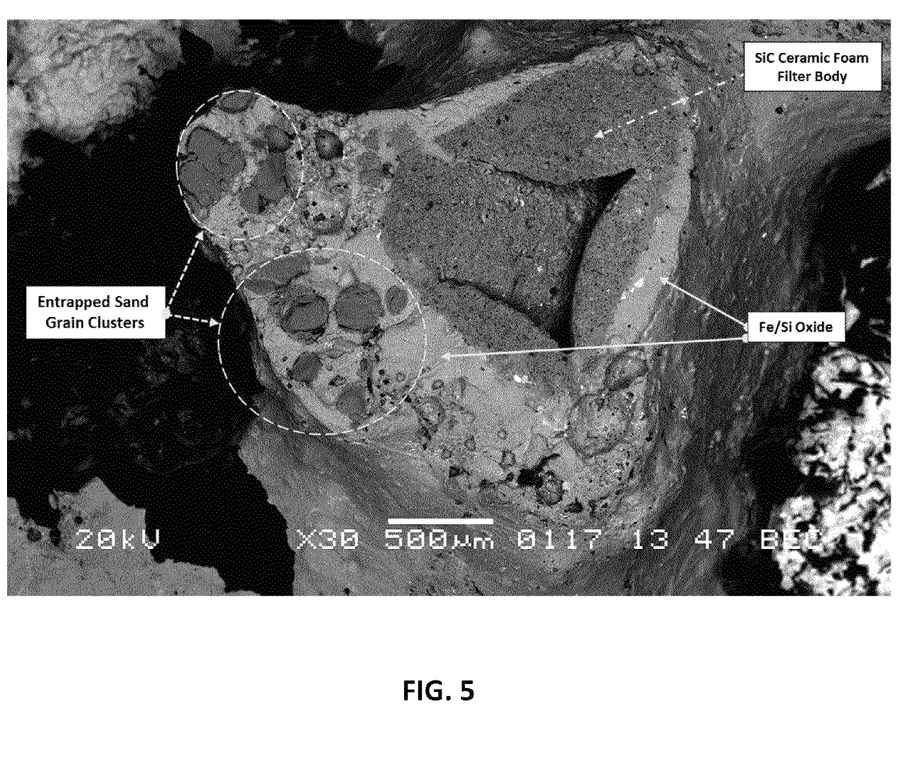
FIG. 5 is a back scattered SEM image of a coated silicon carbide ceramic foam filter of the present invention, showing entrapped sand cluster inclusions after the filter was used to cast ductile iron.

FIG. 5 is a back scattered SEM image of the coated silicon carbide ceramic foam filter, showing the captured sand cluster inclusions.

An EDXA analysis of the surface-active coating revealed it had been converted to a compound similar to spinel, which although somewhat different than the results of the first tests using the cellular filter type, was attributed to the different reaction byproducts found in the ductile iron that was cast. As shown in Tables 4 and 5 below, a histogram of the spinel-like compound revealed that almost all of the original iron in the iron silicon oxide coating had been replaced by the absorbed magnesium particulates, demonstrating that as the molten ductile iron made contact with the active coating the magnesium-reaction byproducts formed a solid solution within the surface-active coating. Without the coating, these harmful compounds could have continued on through the filter and into the end casting. A cross-section analysis of each of the reticulated ceramic foam filters showed that the surface-active coating was spread across the surface-face of the filter, and extended depth-wise approximately halfway through the interior of each filter. The bottom portion of each analyzed reticulated ceramic foam filter showed no captured inclusions or surface-active coating.

Table 4 illustrates the EDXA histogram analysis of the iron silicon oxide coating before filtering the molten alloy.

TABLE 4

| Element | Weight % | Atomic % |
|---|---|---|
| O | 39.00 | 61.02 |
| Mg | 0.98 | 1.01 |
| Al | 3.78 | 3.51 |
| Si | 17.92 | 15.97 |
| S | 0.39 | 0.30 |
| K | 2.30 | 1.47 |
| Ca | 4.22 | 2.63 |
| Ti | 0.36 | 0.19 |
| Fe | 30.82 | 13.81 |
| Zn | 0.23 | 0.09 |
| Sum | 100 | 100 |

Table 5 illustrates the EDXA histogram analysis of the iron silicon oxide coating after filtering the molten alloy, demonstrating a significant increase in Mg.

TABLE 5

| Element | Weight % | Atomic % |
|---|---|---|
| O | 49.94 | 63.84 |
| Mg | 6.40 | 5.38 |
| Al | 12.05 | 9.13 |
| Si | 26.83 | 19.53 |
| Cl | 1.07 | 0.61 |
| K | 0.27 | 0.14 |
| Ca | 0.19 | 0.10 |
| Ti | 1.20 | 0.51 |
| Fe | 2.06 | 0.75 |
| Sum | 100 | 100 |

Comparative Examples

For each of the surface-active coated filter tests, an identical control test was conducted using the same filter type, but without the surface-active coating. Both the test mold and the control mold were poured from the same pouring ladle to ensure the chemical parameters of the molten alloy were identical in order to eliminate any possible variance later when running the chemical analysis on the results. Similarly, all other test application parameters were identical and both the test and control were run at the same time for each batch.

After cooling and shakeout, control filter samples were removed from the runner systems and or riser sleeves to be sectioned and processed for optical and electron microscopic analysis. Optical analysis on cross-sections and deep etched fragments of both the ceramic-cellular filters and the reticulated ceramic foam filters revealed they had both captured a few large-particulate inclusions such as multiple grains of mold-sand, but smaller particulate inclusions had passed through the control filter. The reticulated ceramic foam filter cross-sections also showed only a few multiple grain sand inclusions trapped within the interior of each filter.

For both the cellular and reticulated ceramic foam filter control samples, there was no evidence that any alloy-specific inclusions such as manganese silicate or magnesium reaction by-product particulates were captured and are assumed to have passed through each of the control filters.

Cross sections of both the cellular and reticulated ceramic foam filter control samples were deep-etched with methyl bromine, in the same manner as the coated surface-active filter samples, in order to observe any residual inclusions that may have been attached to the surface face or interior of each control filter type after the iron was dissolved away. Unlike the surface-active coated filters, the methyl bromine etched control samples showed few attached residual sand grain or cluster inclusions. Although the non-etched control filter cross-sections did show a few captured multi-grain sand inclusions, many more visible sand grain cluster inclusions were captured by the surface-active coated filters. An examination of the control filter residual methyl bromine solution after post-etching revealed that a small number of sand grain inclusions had indeed washed out along with the iron alloy and were present in the residual debris.

Figure 6A:
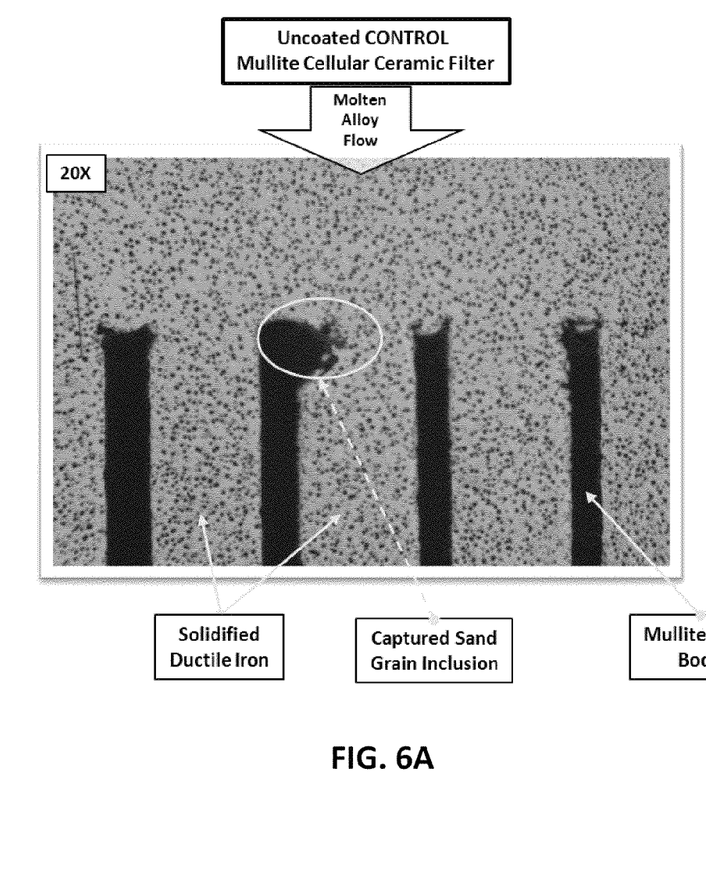
FIG. 6A is an optical micrograph showing a cross section of a standard untreated cellular honeycomb ceramic filter after it was used to cast ductile iron. Relatively few sand grain inclusions were captured by the uncoated filter.

FIG. 6A is an optical micrograph showing a cross section of a standard untreated cellular honeycomb ceramic filter after it was used to cast ductile iron. Relatively few sand grain inclusions were captured by the uncoated filter.

Figure 6B:
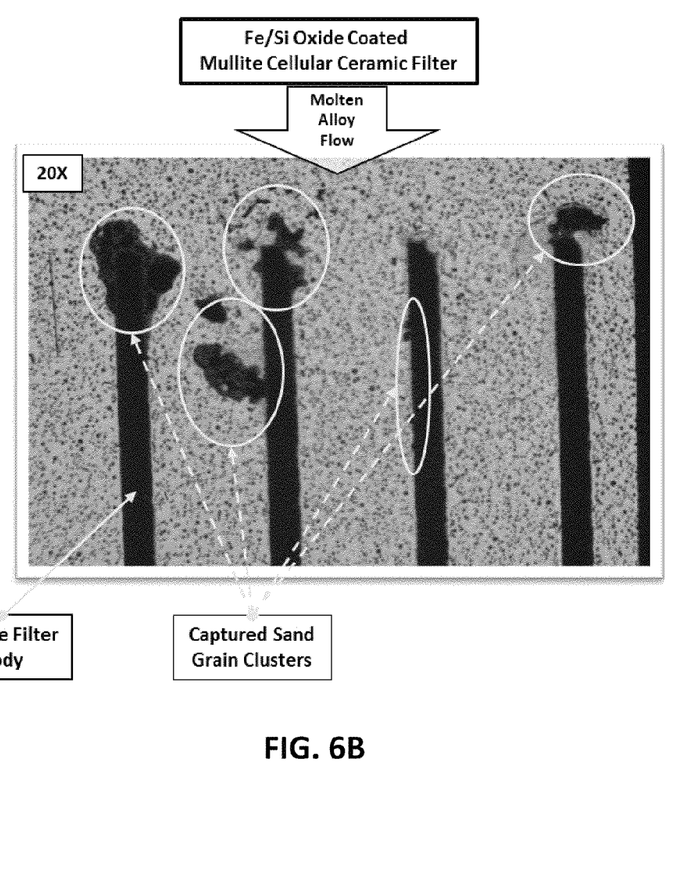
FIG. 6B is an optical micrograph showing a cross section of a cellular honeycomb ceramic filter similar to that shown in FIG. 6A, but including a coating of the present invention, after the filter was used to cast ductile iron. Many sand and grain clusters were captured by the coated filter.

FIG. 6B is an optical micrograph showing a cross section of a cellular honeycomb ceramic filter similar to that shown in FIG. 6A, but including a coating of the present invention, after the filter was used to cast ductile iron. Many sand and grain clusters were captured by the coated filter.

Figure 7A:
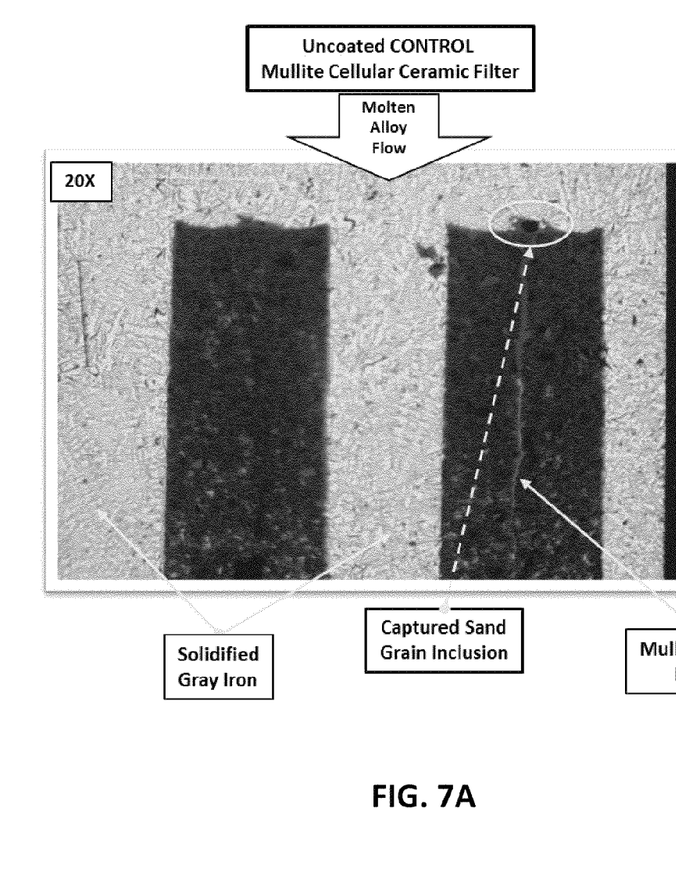
FIG. 7A is an optical micrograph showing a cross section of a standard untreated cellular honeycomb ceramic filter after it was used to cast gray iron. Relatively few sand grain inclusions were captured by the uncoated filter.

FIG. 7A is an optical micrograph showing a cross section of a standard untreated cellular honeycomb ceramic filter after it was used to cast gray iron. Relatively few sand grain inclusions were captured by the uncoated filter.

Figure 7B:
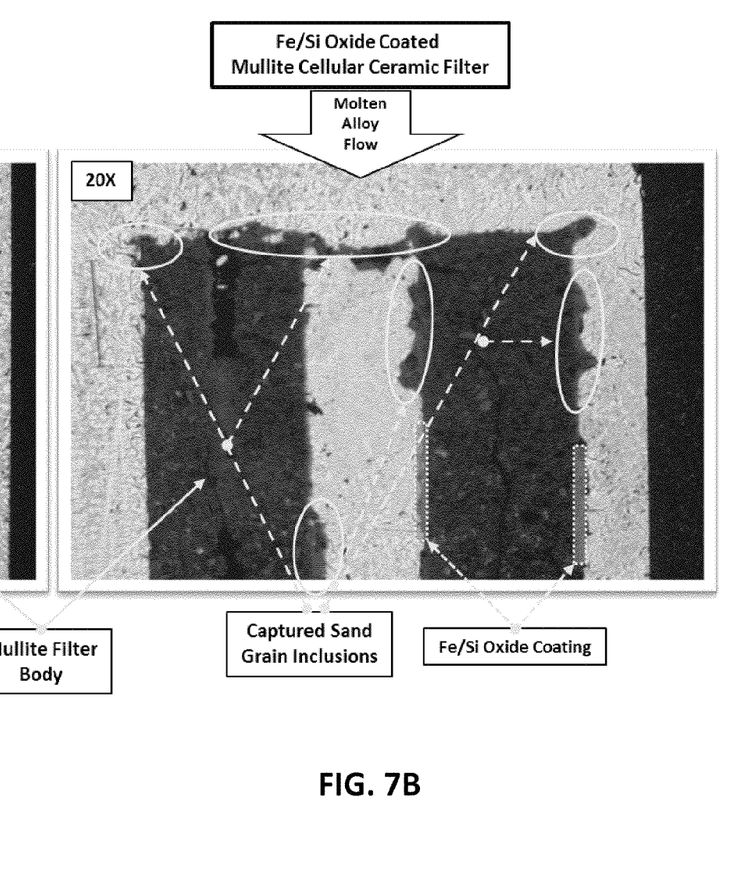
FIG. 7B is an optical micrograph showing a cross section of a cellular honeycomb ceramic filter similar to that shown in FIG. 7A, but including a coating of the present invention, after the filter was used to cast gray iron. Many sand and grain clusters were captured by the coated filter.

FIG. 7B is an optical micrograph showing a cross section of a cellular honeycomb ceramic filter similar to that shown in FIG. 7A, but including a coating of the present invention, after the filter was used to cast gray iron. Many sand and grain clusters were captured by the coated filter.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coated refractory substrate capable of withstanding exposure to molten metal comprising:
   a refractory substrate; and
   a coating on at least a portion of the substrate comprising a silicate binder and a metallurgical slag comprising an iron silicon oxide active component.

2. The coated refractory substrate of claim 1, wherein the coating comprises a first layer comprising the silicate binder and a second layer comprising the metallurgical slag.

3. The coated refractory substrate of claim 2, wherein the first layer contacts the refractory substrate and the second layer covers at least a portion of the first layer.

4. The coated refractory substrate of claim 3, wherein the second layer covers substantially all of the first layer.

5. The coated refractory substrate of claim 1, wherein the iron silicon oxide active component comprises $Fe_2SiO_4$, $Fe_2O_3$, FeO, $SiO_2$ or a combination thereof.

6. The coated refractory substrate of claim 1, wherein the iron silicon oxide active component comprises $Fe_2O_3$, FeO and $SiO_2$.

7. The coated refractory substrate of claim 1, wherein the iron silicon oxide active component comprises at least one additional oxide selected from $Al_2O_3$, CaO, ZnO and MgO.

8. The coated refractory substrate of claim 1, wherein the silicate binder comprises potassium silicate.

9. The coated refractory substrate of claim 1, wherein the silicate binder further comprises sodium silicate.

10. The coated refractory substrate of claim 2, wherein the first layer has a thickness of from about 25 to about 130 microns, and the second layer has a thickness of from about 300 to about 500 microns.

11. The coated refractory substrate of claim 1, wherein the metallurgical slag comprises from about 20 to about 99 weight percent of the coating and the silicate binder comprises from about 1 to about 80 weight percent of the coating.

12. The coated refractory substrate of claim 1, wherein the metallurgical slag has an average particle size range of from about 30 to about 3,500 microns.

13. The coated refractory substrate of claim 1, wherein the refractory substrate comprises at least one ceramic selected from aluminum oxide, magnesium oxide, zirconium oxide, aluminum silicate and silicon carbide.

14. The coated refractory substrate of claim 1, wherein the refractory substrate comprises silica.

15. The coated refractory substrate of claim 1, wherein the refractory substrate comprises a filter.

16. The coated refractory substrate of claim 15, wherein the filter comprises a reticulated ceramic foam filter, a cellular honeycomb structure filter, a ceramic coated silica mesh filter, a ceramic coated fiberglass mesh filter, a silica mesh filter, a fiberglass mesh filter, a ceramic coated steel wire mesh filter, a steel wire mesh filter or an extruded ceramic lattice filter.

17. The coated refractory substrate of claim 1, wherein the refractory substrate comprises an inner surface of a ceramic pour cone, an inner surface lining of a pouring ladle, an inner surface of a riser sleeve, a molten alloy-contacting surface of a ceramic fitted runner or a molten alloy-contacting surface of an article for removing metallurgical slag or other impurities from a cast alloy.

18. A method of coating a refractory substrate comprising depositing a coating on at least a portion of the substrate comprising a silicate binder and a metallurgical slag comprising an iron silicon oxide active component to produce a coated refractory substrate of claim 1.

19. A method of filtering molten metal comprising passing molten metal through a coated refractory substrate of claim 1.

20. The method of claim 19, wherein the molten metal comprises a ferrous alloy.

21. A coated refractory substrate capable of withstanding exposure to molten metal comprising:
   a refractory substrate; and
   a coating on at least a portion of the substrate comprising a silicate binder and a metallurgical slag comprising an iron silicon oxide active component, wherein the coating comprises a first layer comprising the silicate binder and a second layer comprising the metallurgical slag, and the first layer does not include the metallurgical slag.

22. A coated refractory filter capable of withstanding exposure to molten metal when the molten metal passes through the filter comprising:
   a porous refractory filter; and
   a coating on at least a portion of the porous refractory filter comprising a silicate binder and a metallurgical slag comprising an iron silicon oxide active component.

* * * * *